(12) United States Patent
Musselman (10) Patent No.: US 11,933,381 B2
(45) Date of Patent: Mar. 19, 2024

(54) COMPOSITE LEAF SPRING AND METHOD OF MANUFACTURE

(71) Applicant: AUTOMOTIVE INSIGHT, LLC, Birmingham, MI (US)

(72) Inventor: Thomas A. Musselman, Plymouth, MI (US)

(73) Assignee: Automotive Insight, LLC, Birmingham, MI (US)

( * ) Notice: Subject to any disclaimer, the term of this patent is extended or adjusted under 35 U.S.C. 154(b) by 310 days.

(21) Appl. No.: 17/285,318

(22) PCT Filed: Oct. 17, 2019

(86) PCT No.: PCT/US2019/056724
§ 371 (c)(1),
(2) Date: Apr. 14, 2021

(87) PCT Pub. No.: WO2020/081802
PCT Pub. Date: Apr. 23, 2020

(65) Prior Publication Data
US 2021/0356010 A1    Nov. 18, 2021

Related U.S. Application Data

(60) Provisional application No. 62/746,839, filed on Oct. 17, 2018.

(51) Int. Cl.
*F16F 1/368* (2006.01)
*B29C 70/46* (2006.01)
(Continued)

(52) U.S. Cl.
CPC ........... *F16F 1/3686* (2013.01); *B29C 70/46* (2013.01); *B29C 70/84* (2013.01);
(Continued)

(58) Field of Classification Search
CPC .. F16F 1/368; F16F 1/3686; F16F 2224/0241; F16F 2226/04;
(Continued)

(56) References Cited

U.S. PATENT DOCUMENTS

| 2,667,347 A | * | 1/1954 | Jacobs | F16F 1/20 267/37.2 |
| 4,278,726 A | | 7/1981 | Wieme | |

(Continued)

FOREIGN PATENT DOCUMENTS

| CN | 107269750 A | * | 10/2017 | ............. B29B 11/00 |
| DE | 102013218539 A1 | * | 3/2015 | ............. B60G 7/001 |
| WO | WO-0177771 A1 | * | 10/2001 | ........... B29C 53/585 |

OTHER PUBLICATIONS

International Preliminary Report on Patentability for International Application No. PCT/US2019/056724 dated Apr. 29, 2021.
(Continued)

*Primary Examiner* — Robert A. Siconolfi
*Assistant Examiner* — San M Aung
(74) *Attorney, Agent, or Firm* — Carlson, Gaskey & Olds, P.C.

(57) ABSTRACT

An illustrative example composite leaf spring includes first and second bushing tubes near longitudinal ends. A ribbon of base material is wrapped at least partially around the first and second bushing tubes. The base material has a width that defines a width of the leaf spring. First portions of the base material are near the longitudinal ends and a second portion is between the first portions. The second portion is thicker than the first portions. A plurality of layers of a ribbon of tension material are wrapped around the base material. The tension material defines an outermost layer of the leaf spring. The tension material has warp strands in a longitudinal direction between the first and second longitudinal ends of the leaf spring and weft strands transverse to the
(Continued)

warp strands. The warp strands establish a majority of a composition of the tension material.

20 Claims, 8 Drawing Sheets

(51) Int. Cl.
   *B29C 70/84* (2006.01)
   *B29L 31/00* (2006.01)
   *B60G 11/02* (2006.01)
(52) U.S. Cl.
   CPC ......... *B29L 2031/774* (2013.01); *B60G 11/02* (2013.01); *B60G 2202/11* (2013.01); *B60G 2206/428* (2013.01); *B60G 2206/7101* (2013.01); *B60G 2206/81* (2013.01); *F16F 2224/0241* (2013.01); *F16F 2226/04* (2013.01); *F16F 2238/022* (2013.01)
(58) Field of Classification Search
   CPC .... F16F 2238/022; B29C 70/46; B29C 70/84; B29L 2031/774; B60G 11/02; B60G 2202/11; B60G 2206/81; B60G 2206/428; B60G 2206/7101
   USPC .......................................................... 267/47
   See application file for complete search history.

(56) References Cited

U.S. PATENT DOCUMENTS

| | | | |
|---|---|---|---|
| 4,530,490 A | | 7/1985 | Misumi et al. |
| 4,659,071 A | * | 4/1987 | Woltron ................ F16F 1/3686 156/169 |
| 4,688,778 A | | 8/1987 | Woltron |
| 4,707,317 A | | 11/1987 | Epel et al. |
| 4,894,108 A | | 1/1990 | Richard et al. |
| 5,718,212 A | | 2/1998 | Allshouse et al. |
| 6,422,540 B1 | * | 7/2002 | Pfletschinger .......... F16F 1/368 156/185 |
| 6,461,455 B1 | * | 10/2002 | Meatto ................... B60G 11/02 156/275.5 |
| 6,679,487 B2 | | 1/2004 | Meatto et al. |
| 9,597,938 B2 | | 3/2017 | Spiegel et al. |
| 9,657,799 B2 | | 5/2017 | Spiegel et al. |
| 11,156,259 B2 | * | 10/2021 | Krieg .................... B60G 11/02 |
| 2012/0211931 A1 | * | 8/2012 | Fane De Salis ........ F16F 1/368 267/158 |
| 2013/0056900 A1 | * | 3/2013 | Muller .................... F16F 1/368 264/258 |
| 2014/0284855 A1 | * | 9/2014 | Spiegel ................. B60G 11/02 267/36.1 |

OTHER PUBLICATIONS

International Search Report and Written Opinion for International application No. PCT/US19/56724 dated Jan. 9, 2020.

* cited by examiner

COMPOSITE LEAF SPRING AND METHOD OF MANUFACTURE

CROSS REFERENCE TO RELATED APPLICATION

This application is the national stage of International Application No. PCT/US2019/056724, which claims priority to U.S. Provisional Application No. 62/746,839, filed on Oct. 17, 2018.

BACKGROUND

Leaf springs have been used in a variety of situations including automotive suspensions. Leaf springs have traditionally been made from steel, include a bushing at each end and are attached to a vehicle axle near a middle of the spring. The dimensions and shape of the spring may vary to respond to a load with a desired spring rate to achieve a desired ride quality or comfort level.

More recently, composite leaf springs have been introduced. While composite leaf springs demonstrate some advantages over steel leaf springs, previous designs and methods of manufacture have proven costly. For example, composite leaf springs may be made by a process that involves winding a filament of glass or carbon fibers lengthwise around a mold half. Another known technique involves laying up sheets of material in a multi-cavity mold, which is designed to make multiple springs at the same time. Each of these example processes occupy the mold during the process of building the spring. Typical filament winding processes take twenty to thirty minutes for each spring pair. Multiple cavity molds tend to be very expensive because all of the cavities are typically exactly the same, which increases the expense of the mold.

Typical composite spring assembly processes involve molding the spring body and then cutting it to a desired length. End fittings then have to be secured onto the spring body to provide a location to mount a bushing at each end. The process of securing end fittings and the materials involved in manufacturing such fittings adds additional processing time and cost. Further, the fitting attachment for some composite springs presents an area that is subject to high stress and may limit the durability or capability of the spring.

SUMMARY

An illustrative example composite leaf spring includes a first bushing tube near a first longitudinal end of the leaf spring and a second bushing tube near a second longitudinal end. A base material comprises a ribbon having a width that defines a width of the leaf spring. The base material has first portions near the longitudinal ends of the leaf spring and a second portion between the first portions. The first portions have a first thickness and the second portion has a second, larger thickness. The base material is wrapped at least partially around the first and second bushing tubes. A plurality of layers of tension material are wrapped around the base material. The tension material comprises a ribbon having a width corresponding to the width of the base material. The tension material defines an outermost layer of the leaf spring. The tension material has warp strands in a longitudinal direction between the first and second longitudinal ends of the leaf spring. The warp strands establish a majority of a composition of the tension material.

An example embodiment having one or more features of the composite leaf spring of the previous paragraph includes a plurality of layers of intermediate material between the base material and the tension material. The intermediate material comprises a ribbon having a width corresponding to the width of the base material. The intermediate material has warp strands in the longitudinal direction and weft strands at an oblique angle to the warp strands of the intermediate material.

In an example embodiment having one or more features of the composite leaf spring of any of the previous paragraphs, the weft strands of a first layer of the intermediate material are at a first oblique angle relate to the warp strands and the weft strands of a second layer of the intermediate material are at a second, different oblique angle relative to the warp strands.

In an example embodiment having one or more features of the composite leaf spring of any of the previous paragraphs, the weft strands of the first layer of the intermediate material are perpendicular to the weft strands of the second layer of the intermediate material.

An example embodiment having one or more features of the composite leaf spring of any of the previous paragraphs includes clamps respectively received over an outermost layer of the tension material near the bushing tubes. Each clamp introduces a compressive force on the layers of material near the bushing tubes.

In an example embodiment having one or more features of the composite leaf spring of any of the previous paragraphs, the clamps are received around the longitudinal ends of the leaf spring.

In an example embodiment having one or more features of the composite leaf spring of any of the previous paragraphs, the first and second bushing tubes include an exterior having a tapered profile and the base material is wrapped around and contacts the entire exterior of the first and second bushing tubes.

In an example embodiment having one or more features of the composite leaf spring of any of the previous paragraphs, the base material includes warp strands along a length of the base material ribbon and at least one of (i) particles in the second portion that contribute to the second thickness or (ii) a first volume of weft strands in the first portions and a second, larger volume of weft strands in the second portion.

In an example embodiment having one or more features of the composite leaf spring of any of the previous paragraphs, the second, larger volume of weft strands comprises at least one of larger sized weft strands in the second portion or a larger number of weft strands in the second portion.

In an example embodiment having one or more features of the composite leaf spring of any of the previous paragraphs, the longitudinal strands of the tension material comprise carbon fibers.

In an example embodiment having one or more features of the composite leaf spring of any of the previous paragraphs, the base material and the tension material are molded into a shape of the leaf spring and the first and second bushing tubes are molded into the leaf spring.

An illustrated example method of making a composite leaf spring includes supporting a first bushing tube and a second bushing tube a selected distance apart; wrapping a ribbon of base material around the first and second bushing tubes; supporting a length of at least one layer of the base material between the first and second bushing tubes while wrapping the ribbon of base material around the first and second bushing tubes; wrapping a plurality of layers of a ribbon of tension material around the base material; placing the first bushing tube, the second bushing tube, the wrapped ribbon of base material and the wrapped ribbon of tension material into a mold; and establishing a shape of the composite leaf spring in the mold with the first and second bushing tubes molded into the composite leaf spring.

An example embodiment having one or more features of the method of the previous paragraph includes wrapping a plurality of layers of a ribbon of intermediate material around the base material before wrapping the tension material around the base material. The intermediate material has a plurality of warp strands aligned with a length of the composite leaf spring and a plurality of weft strands that are at an oblique angle relative to the warp strands.

In an example embodiment having one or more features of the method of any of the previous paragraphs, the base material has first portions near the first and second bushing tubes and a second portion between the first portions, the first portions have a first thickness and the second portion has a second thickness that is greater than the first thickness.

An example embodiment having one or more features of the method of any of the previous paragraphs includes applying clamps to an exterior of the composite leaf spring near the first and second bushing tubes.

Various features and advantages of at least one disclosed example embodiment will become apparent to those skilled in the art from the following detailed description. The drawings that accompany the detailed description can be briefly described as follows.

DETAILED DESCRIPTION

Figure 1:
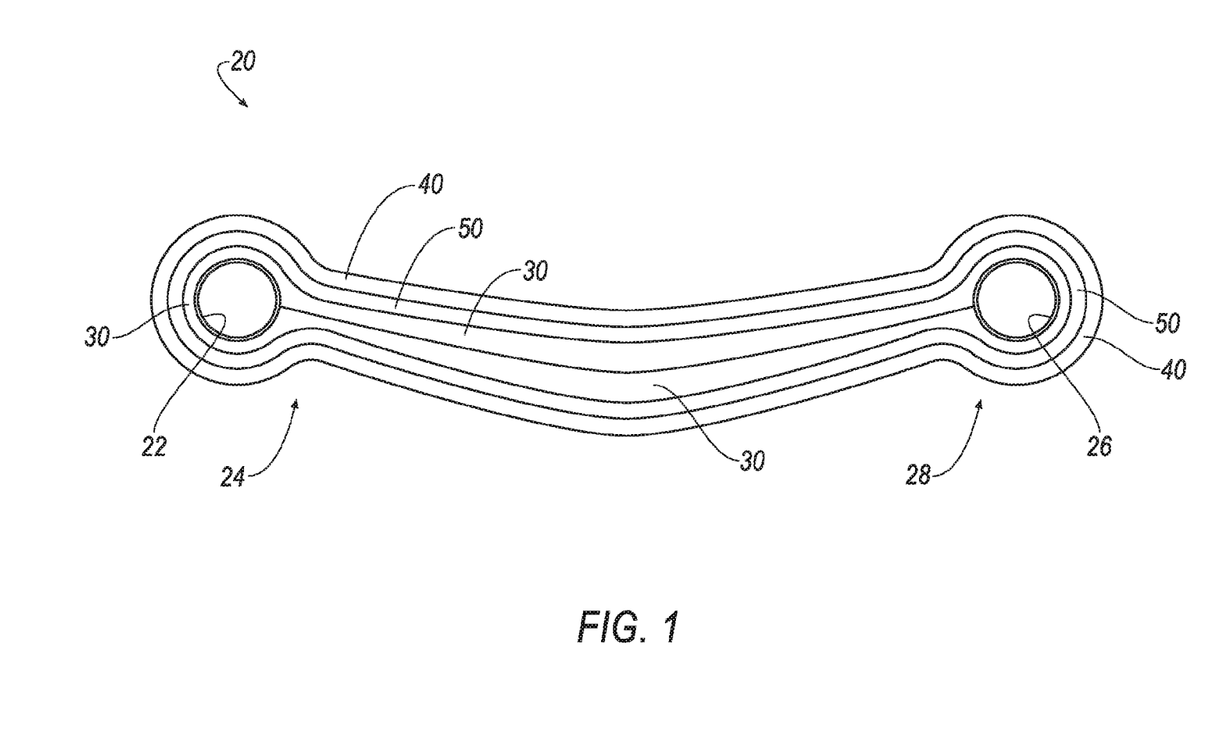
FIG. 1 schematically illustrates a composite leaf spring designed according to an embodiment of this invention.

FIG. 1 schematically illustrates an example embodiment of a composite leaf spring 20. A first bushing tube 22 is situated near a first longitudinal end 24 of the spring 20. A second bushing tube 26 is situated near a second longitudinal end 28 of the spring 20.

A base material 30 is wrapped around the first bushing tube 22 and the second bushing tube 26 to establish the inner most layers of the composite spring 20. A selected length of the base material 30 between the bushing tubes establishes a desired length of the leaf spring 20.

Figure 2:
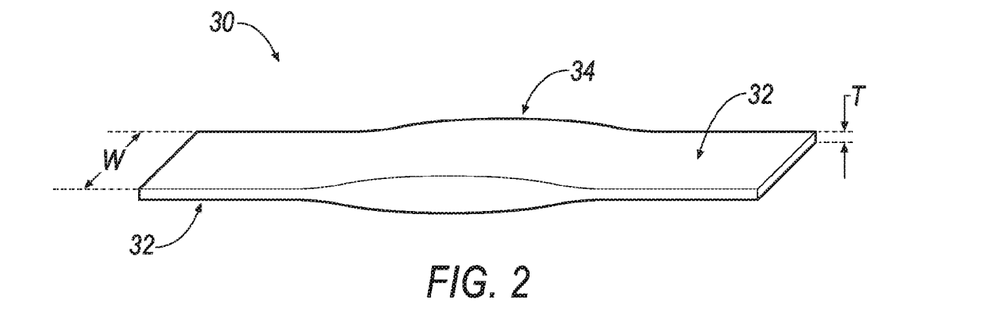
FIG. 2 diagrammatically illustrates selected features of a portion of a base material included in the example embodiment of FIG. 1.
Figure 3:
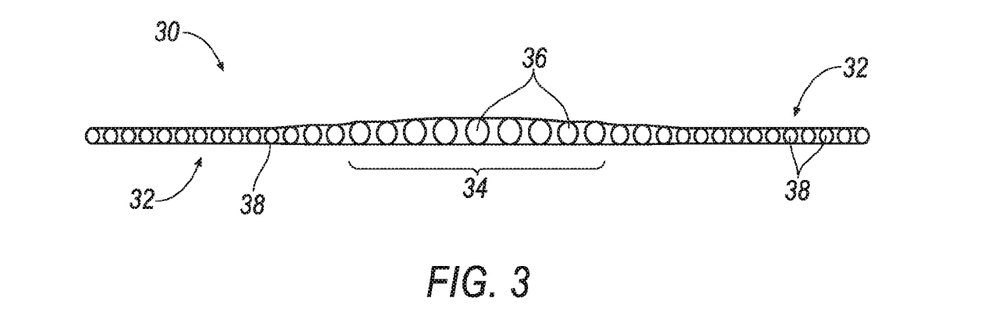
FIG. 3 schematically illustrates selected features of the example base material.

FIGS. 2 and 3 illustrate selected features of an example base material 30. In this example embodiment, the base material 30 includes first portions 32 that are situated near the longitudinal ends 24 and 28 of the assembled spring 20. A second portion 34 is situated between the first portions 32. The first portions 32 of the base material 30 have a first thickness T and the second portion 34 has a second, greater thickness. The increased thickness of the second portion 34 provides a larger thickness of the composite spring 20 near a center of the spring in the illustrated embodiment.

In some embodiments, the base material 30 includes ground particles or an injected material that is added in the second portion 34 to increase the thickness of the second portion 34 compared to the first thickness T of the first portion 32. Such added particles or material are incorporated into the base material 30 prior to wrapping the base material 30 around the bushing tubes 22 and 26. In other embodiments, there is a larger volume of weft strands per unit length in the second portion 34 compared to the volume of weft strands in the first portions 32.

FIG. 3 schematically illustrates an arrangement in which weft strands 36 in the second portion 34 are larger in size compared to the weft strands 38 in the first portions 32. In other embodiments, the larger volume of weft strands includes more weft strands in the second portion 34 compared to the number of weft strands per unit length in the first portions 32. Depending on the selection of the base material, the manner in which the second, greater thickness of the second portion 34 is achieved may vary to meet the needs of a particular leaf spring configuration.

The example base material 30 comprises a ribbon or tape that has a width W that defines a width of the leaf spring 20. The amount of material shown in FIGS. 2 and 3 corresponds to one-half a course or wrap of the base material 30 that is wrapped around the bushing tubes 22 and 26. That which is illustrated (i.e., two first portions 32 and a second portion 34) will be repeated along a longer tape or ribbon that is long enough for at least one course to establish at least two layers of the base material 30 of the spring 20.

The composition of the base material 30 includes consistent, long warp strands in the length direction of the ribbon or tape. The base material 30 may comprise carbon fibers or glass fibers and has sufficient strength to react the shear forces as the spring deflects.

Figure 4:
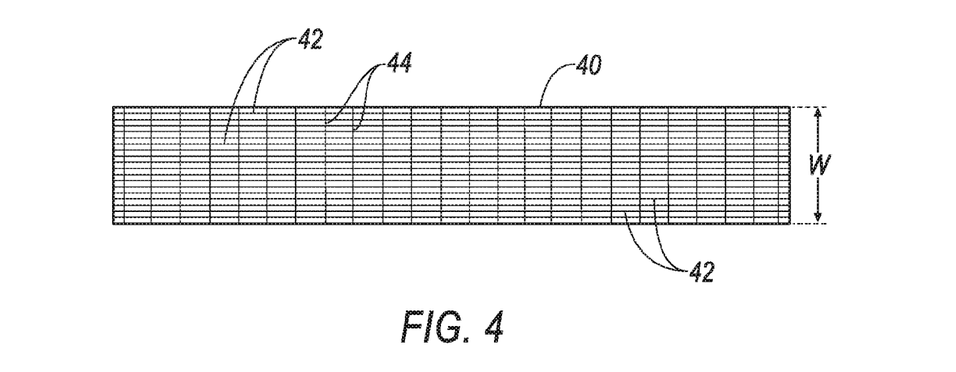
FIG. 4 schematically illustrates selected features of an example tension material included in the embodiment of FIG. 1.

Referring again to FIG. 1, the example leaf spring 20 embodiment includes a plurality of layers of a tension material 40 that is wrapped around the base material 30. The tension material 40 establishes or defines the outermost layer of the composite spring 20. As shown in FIG. 4, the tension material 40 has a width W that corresponds to the width of the base material 30. In this embodiment, the tension material 40 does not require a variable thickness like the base material 30.

In this example embodiment, the tension material comprises a ribbon that includes warp strands 42 aligned with the longitudinal direction of the spring 20 and weft strands 44 that are transverse to the warp strands 42. In the example of FIG. 4, the weft strands 44 are perpendicular to the warp strands 42 and parallel to the width dimension of the ribbon of tension material 40. As schematically shown in FIG. 4, the warp strands establish a majority of a composition of the tension material 40.

The tension material 40 is configured to react to the stresses from vertical deflection of the spring 20. The longitudinally oriented warp strands 42 are long and consistent. The warp strands 42 comprise carbon fibers in some embodiments. In some example embodiments, the tension material comprises fiberglass. The warp strands 42 make up a majority of the composition of the tension material 40 to react to the stresses on the spring 20.

Figure 5A:
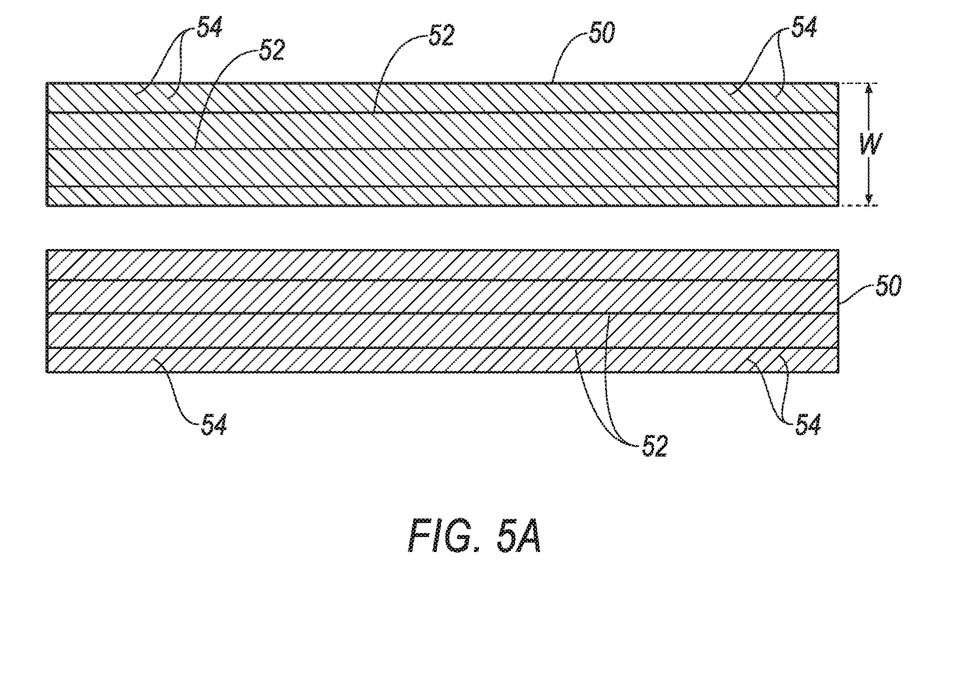
FIG. 5A schematically illustrates selected features of an example intermediate material that is included between a base material and a tension material in some example embodiments.
Figure 5B:
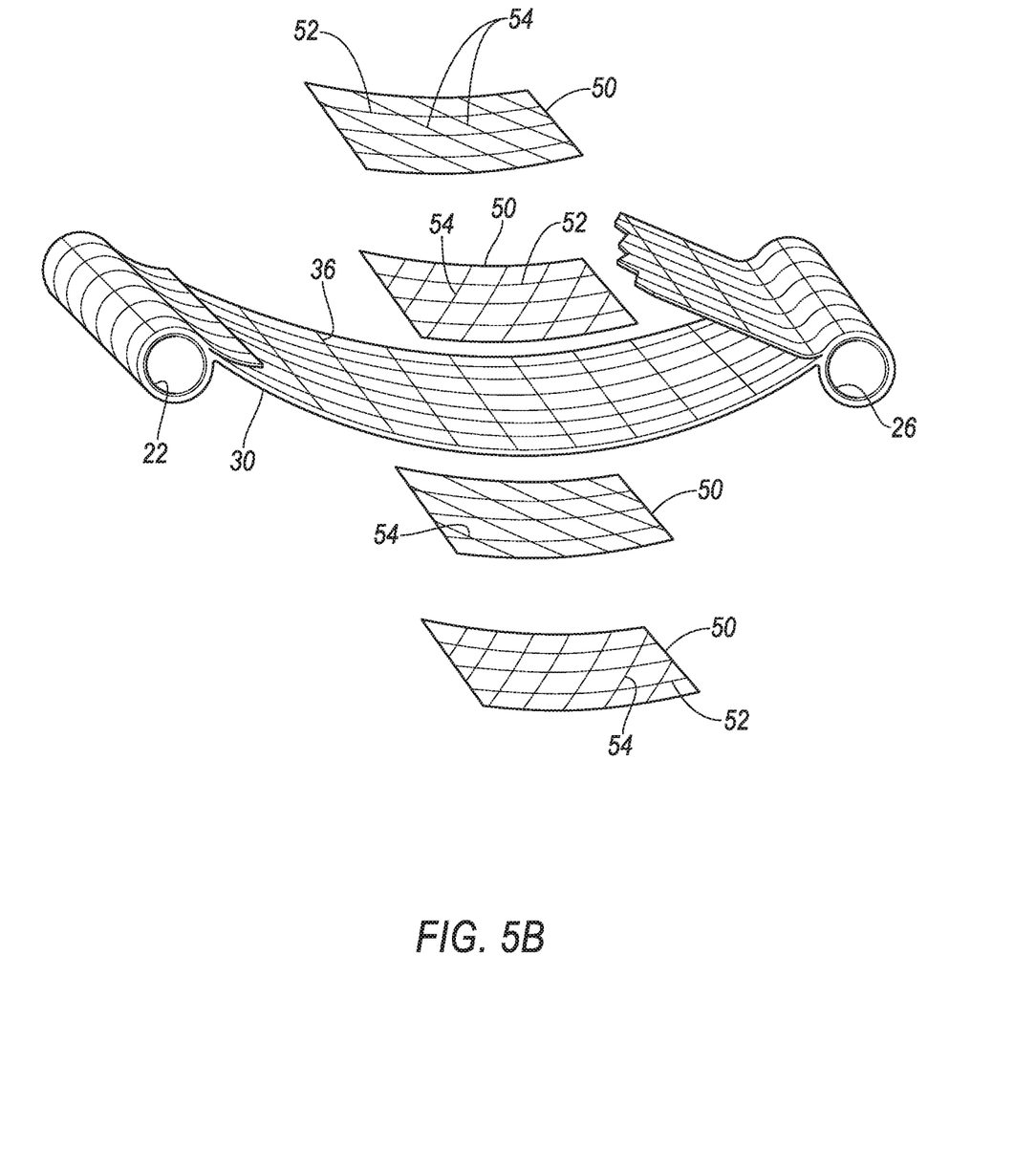
FIG. 5B schematically illustrates another example intermediate material configuration incorporated into a composite spring.

As shown in FIG. 1, the example leaf spring 20 includes a plurality of layers of intermediate material 50 between the base material 30 and the tension material 40. As shown in FIGS. 5A and 5B, the intermediate material 50 comprises a ribbon in this example having a width W corresponding to the width of the base material 30. The intermediate material 50 has warp strands 52 in the longitudinal direction and weft strands 54 situated at an oblique angle relative to the warp strands 52.

As shown in FIGS. 5A and 5B, some embodiments include multiple layers of the intermediate material 50 with the weft strands 54 of one layer of the intermediate material 50 oriented transverse to the weft strands 54 of another layer of the intermediate material 50. The different oblique angles are symmetric about a longitudinal axis of the spring 20 in some example embodiments. The illustrated example weft strands 54 of one layer are perpendicular to the weft strands 54 of another layer of the intermediate material 50. For example, the weft strands 54 of one layer are oriented at 45° and those of another layer of the intermediate material 50 are oriented at 135°. Other angles are used in other embodiments. The oblique angle of the weft strands allows the intermediate material 50 to react to stresses of lateral and torsional deflection of the spring 20.

In FIG. 1, the layers of intermediate material 50 wrap around the bushing tubes 22, 26 in a manner like the base material 30 and the tension material 40. In FIG. 5B the intermediate material 50 does not extend throughout the entire body of the spring 20'. In that example embodiment shorter length ribbons of the intermediate material 50 are situated between layers of the other materials to provide torsional stiffness near the center of the spring. In the embodiment of FIG. 5B, the intermediate material 50 is incorporated between layers of the base material 30 and effectively contribute to the larger thickness of the layers of the base material 30 near the middle of the spring.

Some embodiments include intermediate material 50 between layers of the tension material 40. Some embodiments do not include an intermediate material 50 between the base material 30 and the tension material 40 because the spring will not be subjected to torsional loads.

For discussion purposes, FIG. 1 shows a single course or wrap of each type of material 30, 40 and 50. A single course or wrap around the bushing tubes 22 and 26 provides a plurality of layers of each of the materials 30, 40 and 50. Many embodiments will include more layers of at least one of the materials to meet the needs of a particular situation.

Figure 6:
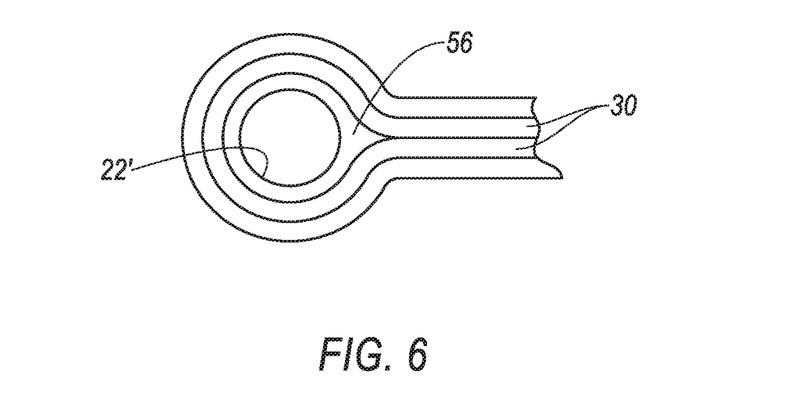
FIG. 6 schematically illustrates a bushing tube configuration that is included in some example embodiments.

The example embodiment of FIG. 1 includes cylindrical bushing tubes 22 and 26. Another example bushing tube configuration used in some embodiments is shown in FIG. 6. In this embodiment, the bushing tube 22' includes a tapered portion 56 that facilitates wrapping the base material 30 around the exterior of the bushing tube 22'. In such embodiments, the base material 30 contacts the entire exterior of the bushing tube.

Figure 7:
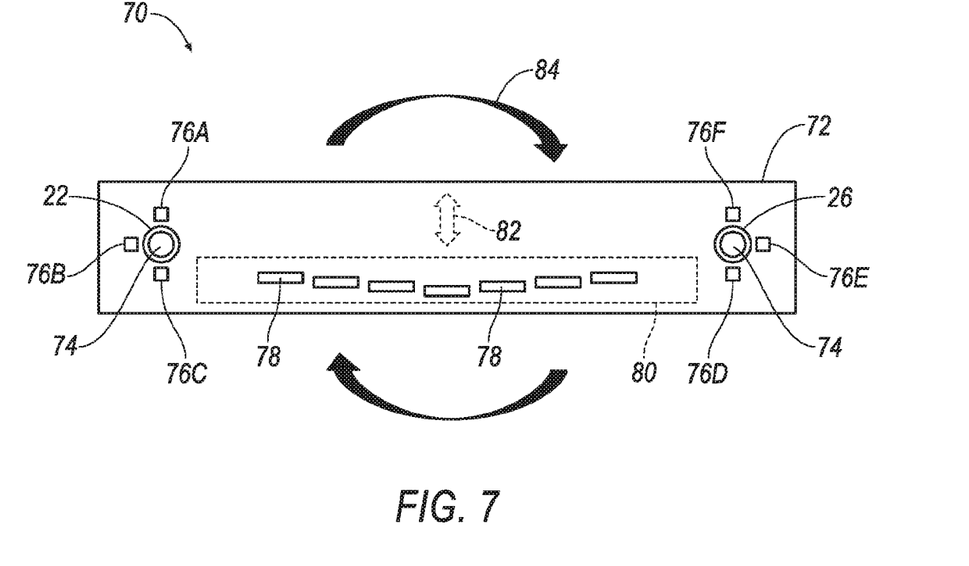
FIG. 7 schematically illustrates a device for making a composite spring designed according to an embodiment of this invention.

FIG. 7 schematically illustrates a device 70 for making composite leaf springs designed according to an embodiment of this invention. The device 70 includes a base 72. Bushing tube supports 74 are situated on the base 72 and support the bushing tubes 22 and 26. A plurality of material clamps 76 are situated near the bushing tube supports 74. A plurality of material supports 78 are situated between the bushing tube supports 74. The material supports 78 have a common support base 80 that is moveable relative to the base 72 as schematically represented by the arrows 82. Such movement allows the material supports 78 to be situated in various locations during a spring making process and to facilitate making a variety of leaf springs. The base 72 is rotatable as schematically represented by the arrows 84.

Figure 8:
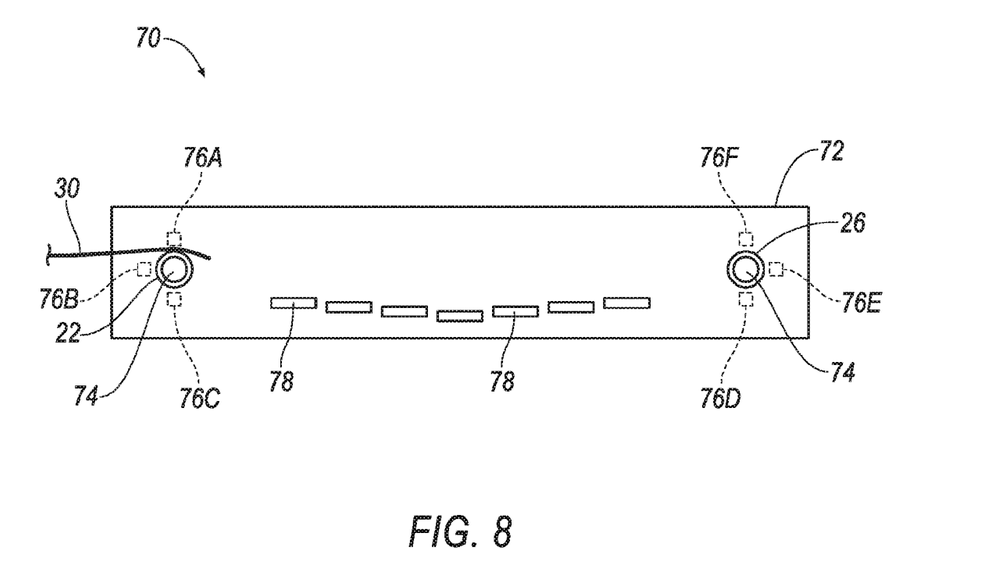
FIG. 8 schematically illustrates a portion of a composite spring making process using the device of FIG. 7.

An example process of making a composite leaf spring using the device 70 is schematically demonstrated in FIGS. 8 through 11. In FIG. 8 the material clamps 76 are shown in broken lines because they are retracted or otherwise moved relative to the base 72 so that they are not in a position to hold material against the bushing tube supported on the nearby bushing tube support 74. The retracted position leaves clearance between the material clamps 76 and the bushing tubes 22, 26 so that a ribbon or tape of base material 30 can be moved, by a robot for example, into a position like that shown in FIG. 8. The base material 30 is fed from a spool or other supply (not illustrated). Once the base material 30 is in the position shown in FIG. 8, the material clamp 76A is moved into a clamping position to hold the end of the base material 30 against the bushing tube 22.

Figure 9:
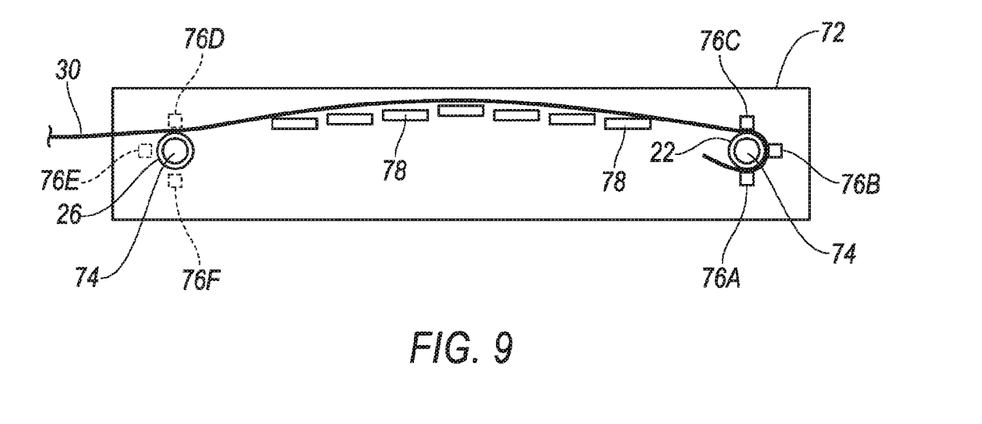
FIG. 9 schematically illustrates another portion of the composite spring making process.

The base 72 rotates in a clockwise direction and as the base material 30 wraps around the bushing tube 22, the material clamps 76B and 76C move into a clamping position to hold the corresponding portion of the base material 30 against the bushing tube 22. FIG. 9 shows the base 72 after a 180° clockwise rotation from the position shown in FIG. 8. More of the base material 30 has been pulled from the supply and extends from the supply to the bushing tube 22. In this position, the material supports 78 are beneath the base material 30 to ensure that a sufficient length of the base material 30 is between the bushing tubes 22 and 26 as needed to establish the length of the leaf spring that is being made.

In the position of FIG. 9, the material clamps 76D, 76E and 76F remain in a retracted position. As the base 72 continues rotating in a clockwise direction and the base material 30 encounters and wraps around the bushing tube 26, the material clamps 76D, 76E and 76F move into a clamping position to hold the base material 30 against the bushing tube 26.

Figure 10:
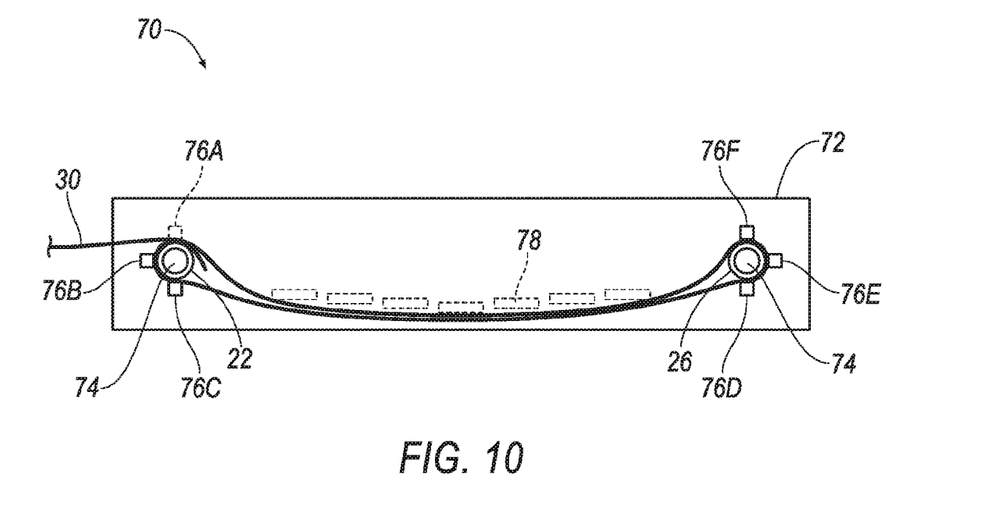
FIG. 10 schematically illustrates another portion of the example process.

FIG. 10 shows the base 72 after another 180° clockwise rotation from the position shown in FIG. 9. As the base 72 moves between the positions of FIGS. 9 and 10, the material supports 78 retract or otherwise move out of the supporting position to allow a second layer of the base material 30 to be received against the first layer that extends between the bushing tubes 22 and 26. The material clamp 76A is in a retracted position to allow the base material to be received into the position shown in FIG. 10. The material clamp 76A moves into a clamping position as the base 72 continues to rotate and the material clamps 76B and 76C sequentially move into a retracted position and then back into a clamping position to secure a second layer of the base material in place around the bushing tube 22 over the first layer of the base material 30.

Figure 11:
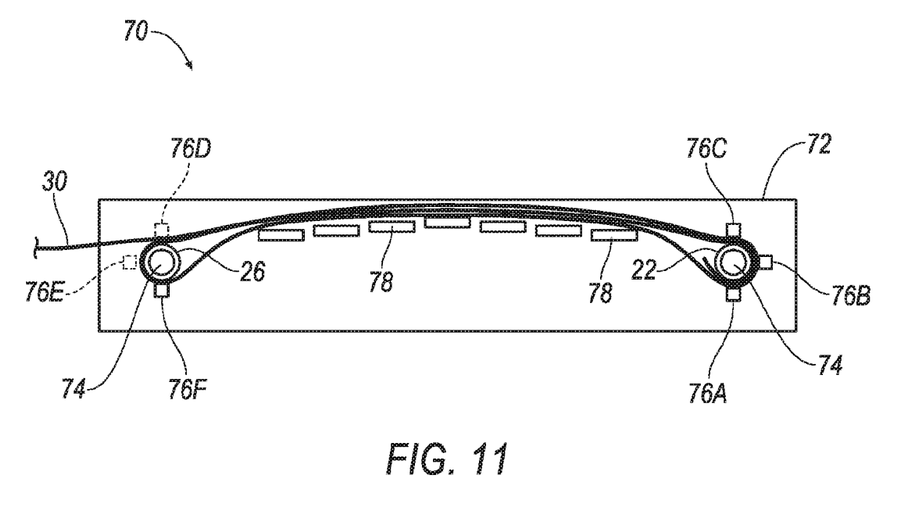
FIG. 11 schematically illustrates another portion of the example spring making process.

FIG. 11 shows a further stage of the process of making a composite leaf spring after the base 72 has rotated another 180° in a clockwise direction. In this position the material supports 78 have moved back into a supporting position to support three layers of the base material 30. The support base 80 is in a different position compared to that shown in FIG. 9 because of the layers of material that are already wound about the bushing tubes 22 and 26. The base 72 rotates again into the position shown in FIG. 10 with another layer of the base material 30 extending between the bushing tubes 22 and 26.

The stages of the example process shown in FIGS. 9-11 are repeated until the desired number of courses of the base material 30 have been wrapped around the bushing tubes 22 and 26 establishing the desired number of layers of the base material 30. The base material 30 may include markers to facilitate locating a first portion 32 relative to the bushing tube 22 so that the second portion 34 will be in the appropriate central portion of the resulting spring 20. Optical sensors may be included with the device 70 for ensuring proper placement of the base material 30 at the beginning of the illustrated process.

Each material included in the composite spring 20 is applied in the same manner as the base material 30 shown in FIGS. 8 through 11 until all desired layers of material are wrapped around the bushing tubes 22 and 26. After all layers are applied, the bushing tube supports 74 can be taken from the base 72 to move the bushing tubes 22 and 26 and the applied layers of material into a mold that establishes a desired shape of the composite leaf spring 20. In some embodiments resin is introduced into the mold while in other embodiments, at least some of the material used to make the spring includes resin that will melt in the mold. Heating the resin and curing it secures the layers of material together and the mold provides the desired final shape of the spring.

The bushing tubes 22 and 26 are molded into the composite leaf spring 20 so that no subsequent processing or components are needed to include bushing tubes into a composite leaf spring. Having the bushing tubes molded into the composite spring provides a substantial improvement compared to previous manufacturing techniques because no additional processing is required to secure the bushing tubes in place.

Although no post-molding processing is needed to include bushing tubes in the composite spring discussed above, some embodiments do not include bushing tubes on the bushing tube supports 74 of the device 70 and, instead, just the layers of material are wound and then molded. In those instances, known bushing connection configurations may be used to add bushings to the ends of a composite spring.

Utilizing ribbons or tape of material instead of winding individual filaments results in a faster process of building up a composite spring providing additional efficiency missing from previous techniques.

The mold can complete the formation of at least one spring while the device 70 is used to build-up another spring. One of the features of embodiments of this invention is an efficient composite spring-making process. Improved efficiency in the manufacturing process reduces the overall cost of composite springs.

Figure 12:
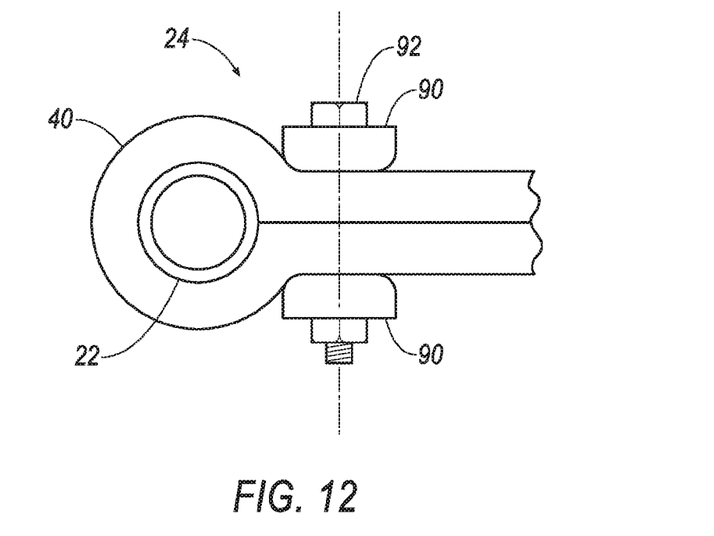
FIG. 12 schematically illustrates selected features of an example embodiment of a composite spring including a clamp near a longitudinal end of the spring.
Figure 13:
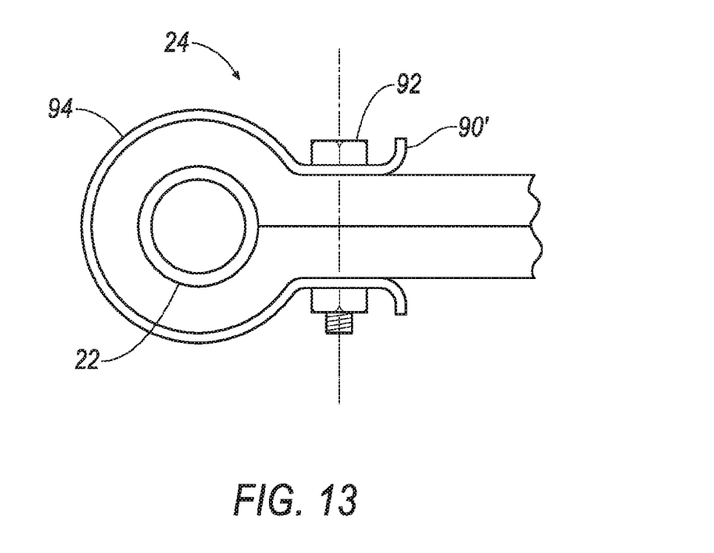
FIG. 13 schematically illustrates another example embodiment of a clamp.

FIG. 12 shows a feature of some embodiments. A clamp 90 is provided near each longitudinal end of the composite leaf spring 20. The clamp 90 includes a fastener 92, such as a bolt, to hold the clamp in place. In this example, the fastener 92 is received through the body of the spring. FIG. 13 shows another example clamp configuration. In this embodiment, the clamp 90' includes a portion 94 is received over the outside edge of the longitudinal end 24.

The clamp 90, 90' provides a compressive force at a location where stresses can exist because of forces acting on the bushings and bushing tubes when the spring is installed as part of a vehicle suspension, for example. Such stresses may be, for example, through-the-thickness tension at the location of the molded in bushing tubes. The compressive force provided by the clamp 90, 90' offsets such stresses.

As will be appreciated by those skilled in the art, embodiments of this invention include a process of making a composite spring that includes winding ribbons or strips of fiber material, which are as wide as the width of the spring, around a form that is not part of the mold used to ultimately shape the spring. Metal bushing tubes are incorporated into the spring inside the wound layers so no subsequent processing is needed to include the bushing tubes. Once the required number of layers of ribbon are wrapped, the laid-up pre-molded spring with tubes is transferred to a mold where the composite material is molded to its final shape and cured into a spring. This process allows a single cavity mold to be fully utilized. During the molding of one spring another spring can be wrapped thus making the process more efficient from a mold utilization perspective. Additionally, using ribbons creates a winding process significantly faster than a process that involves winding filaments.

The integrally molded bushing tubes negate the need for any post process steps of adding end fittings and also eliminates the existing potential failure point present in previous spring configurations.

The device used for winding the ribbon layers can be adjusted for various spring configurations and change-out of the single cavity mold is simple allowing flexible manufacturing and quick-change overs for efficient manufacture of a variety of spring configurations.

Embodiments of the invention include multiple ribbon types used in the build-up to wrap the spring. Each ribbon is configured with fiber orientation that varies depending on where the ribbon will be placed in the spring. The outer layer(s) will have longitudinal long fibers to react the stresses from vertical deflection of the spring, layers below the outer ones or intermingled between successive outer layers will have fibers at oblique angles relative to the spring length to react the stress of lateral and torsional deflection, and the inner most layers will have a configuration that builds up the spring's tapered thickness along its length and has sufficient strength to react the shear forces as the spring deflects. The ribbon configuration and layer construction will be individually designed for each spring based upon its application and usage requirements.

Glass, carbon, or other fibers, and chopped material can be used in the construction of the various ribbons to build a spring that achieves weight reduction over steel springs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A composite leaf spring, comprising:
   a first bushing tube near a first longitudinal end of the leaf spring;
   a second bushing tube near a second longitudinal end of the leaf spring;
   a base material comprising a ribbon having a width that defines a width of the leaf spring, the base material having first portions near the longitudinal ends of the leaf spring and a second portion between the first portions, the first portions having a first thickness, the second portion having a second, larger thickness, the base material being wrapped at least partially around the first and second bushing tubes;
   a plurality of layers of tension material wrapped around the base material, the tension material comprising a ribbon having a width corresponding to the width of the base material, the tension material defining an outermost layer of the leaf spring, the tension material having warp strands in a longitudinal direction between the first and second longitudinal ends of the leaf spring, the warp strands establishing a majority of a composition of the tension material and
   a plurality of layers of intermediate material between the base material and the tension material, the intermediate material comprising a ribbon having a width corresponding to the width of the base material, the intermediate material having warp strands in the longitudinal direction and weft strands at an oblique angle relative to the warp strands of the intermediate material.

2. The composite leaf spring of claim 1, wherein
   the weft strands of a first layer of the intermediate material are at a first oblique angle relative to the warp strands and
   the weft strands of a second layer of the intermediate material are at a second, different oblique angle relative to the warp strands.

3. The composite leaf spring of claim 2, wherein the weft strands of the first layer of the intermediate material are perpendicular to the weft strands of the second layer of the intermediate material.

4. The composite leaf spring of claim 1, comprising clamps respectively received over at an outermost layer of the tension material near the bushing tubes, each clamp introducing a compressive force on the layers of material near the bushing tubes.

5. The composite leaf spring of claim 4, wherein the clamps are received around the longitudinal ends of the leaf spring.

6. The composite leaf spring of claim 1, wherein
   the first and second bushing tubes include an exterior having a tapered profile and
   the base material is wrapped around and contacts the entire exterior of the first and second bushing tubes.

7. The composite leaf spring of claim 1, wherein the base material comprises warp strands along a length of the base material ribbon and at least one of
   (i) particles in the second portion that contribute to the second thickness or
   (ii) a first volume of weft strands in the first portions and a second, larger volume of weft strands in the second portion.

8. The composite leaf spring of claim 7, wherein the second, larger volume of weft strands comprises at least one of larger sized weft strands in the second portion or a larger number of weft strands in the second portion.

9. The composite leaf spring of claim 1, wherein the longitudinal strands of the tension material comprise carbon fibers.

10. The composite leaf spring of claim 1, wherein the base material and the tension material are molded into a shape of the leaf spring and the first and second bushing tubes are molded into the leaf spring.

11. A method of making a composite leaf spring, the method comprising:
    supporting a first bushing tube and a second bushing tube a selected distance apart;
    wrapping a ribbon of base material around the first and second bushing tubes;
    supporting a length of at least one layer of the base material between the first and second bushing tubes while wrapping the ribbon of base material around the first and second bushing tubes;
    wrapping a plurality of layers of a ribbon of tension material around the base material;
    placing the first bushing tube, the second bushing tube, the wrapped ribbon of base material and the wrapped ribbon of tension material into a mold;
    establishing a shape of the composite leaf spring in the mold with the first and second bushing tubes molded into the composite leaf spring; and
    wrapping a plurality of layers of a ribbon of intermediate material around the base material before wrapping the tension material around the base material, wherein the intermediate material has a plurality of warp strands aligned with a length of the composite leaf spring and a plurality of weft strands that are at an oblique angle relative to the warp strands.

12. The method of claim 11, wherein
    the base material has first portions near the first and second bushing tubes and a second portion between the first portions,
    the first portions have a first thickness, and
    the second portion has a second thickness that is greater than the first thickness.

13. The method of claim 11, comprising applying clamps to an exterior of the composite leaf spring near the first and second bushing tubes.

14. A composite leaf spring, comprising:
    a first bushing tube near a first longitudinal end of the leaf spring;
    a second bushing tube near a second longitudinal end of the leaf spring;
    a base material comprising a ribbon having a width that defines a width of the leaf spring, the base material having first portions near the longitudinal ends of the leaf spring and a second portion between the first portions, the first portions having a first thickness, the second portion having a second, larger thickness, the base material being wrapped at least partially around the first and second bushing tubes; and
    a plurality of layers of tension material wrapped around the base material, the tension material comprising a ribbon having a width corresponding to the width of the base material, the tension material defining an outermost layer of the leaf spring, the tension material having warp strands in a longitudinal direction between the first and second longitudinal ends of the leaf spring, the warp strands establishing a majority of a composition of the tension material,
    wherein the base material comprises warp strands along a length of the base material ribbon and at least one of (i) particles in the second portion that contribute to the second thickness or (ii) a first volume of weft strands in the first portions and a second, larger volume of weft strands in the second portion.

15. The composite leaf spring of claim 14, comprising a plurality of layers of intermediate material between the base material and the tension material, the intermediate material comprising a ribbon having a width corresponding to the width of the base material, the intermediate material having warp strands in the longitudinal direction and weft strands at an oblique angle relative to the warp strands of the intermediate material.

16. The composite leaf spring of claim 15, wherein the weft strands of a first layer of the intermediate material are at a first oblique angle relative to the warp strands and the weft strands of a second layer of the intermediate material are at a second, different oblique angle relative to the warp strands.

17. The composite leaf spring of claim 16, wherein the weft strands of the first layer of the intermediate material are perpendicular to the weft strands of the second layer of the intermediate material.

18. The composite leaf spring of claim 14, wherein the second, larger volume of weft strands comprises at least one of larger sized weft strands in the second portion or a larger number of weft strands in the second portion.

19. The composite leaf spring of claim 14, wherein
the first and second bushing tubes include an exterior having a tapered profile and
the base material is wrapped around and contacts the entire exterior of the first and second bushing tubes.

20. The composite leaf spring of claim 14, comprising clamps respectively received over at an outermost layer of the tension material near the bushing tubes, each clamp introducing a compressive force on the layers of material near the bushing tubes.

* * * * *